UNITED STATES PATENT OFFICE.

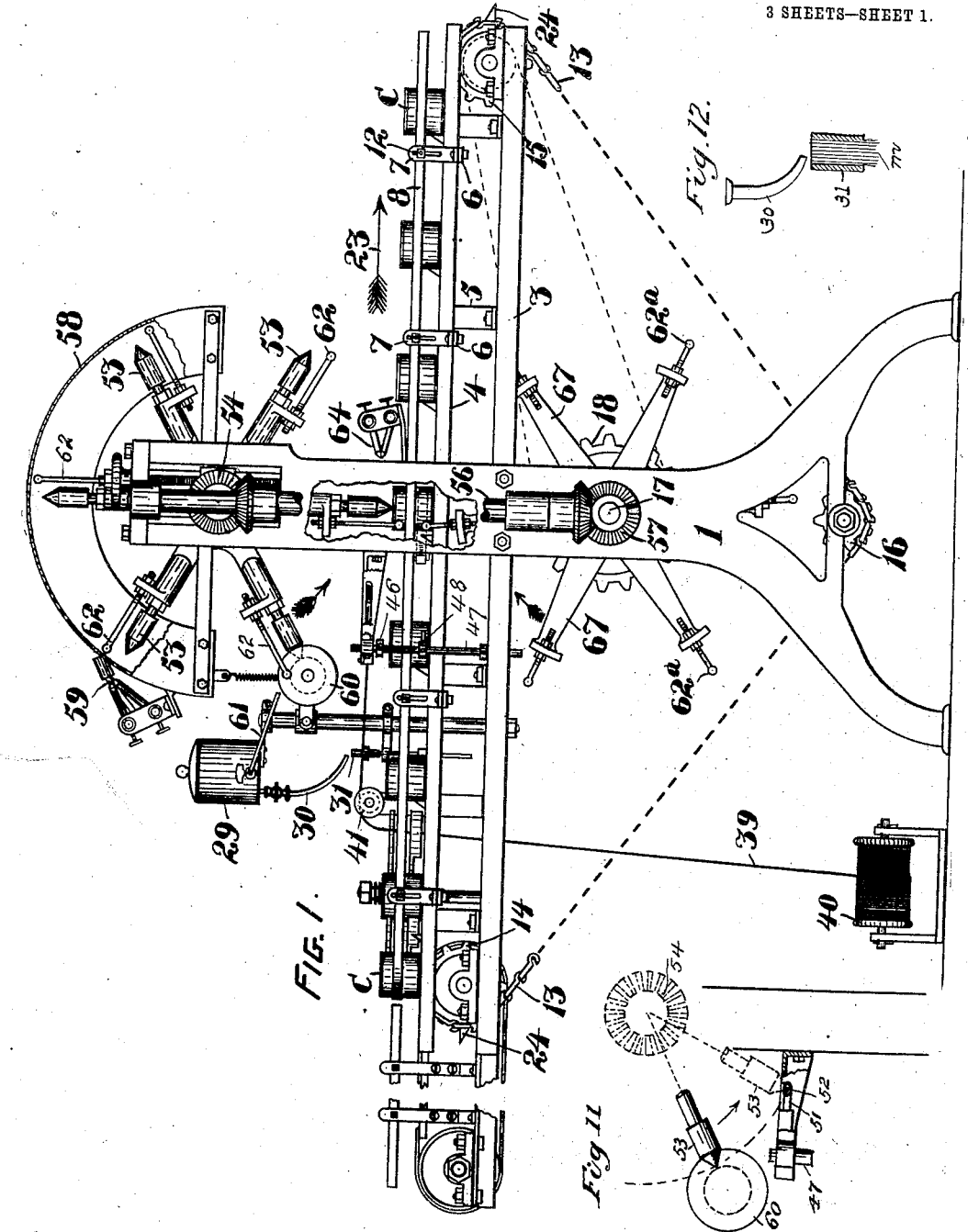

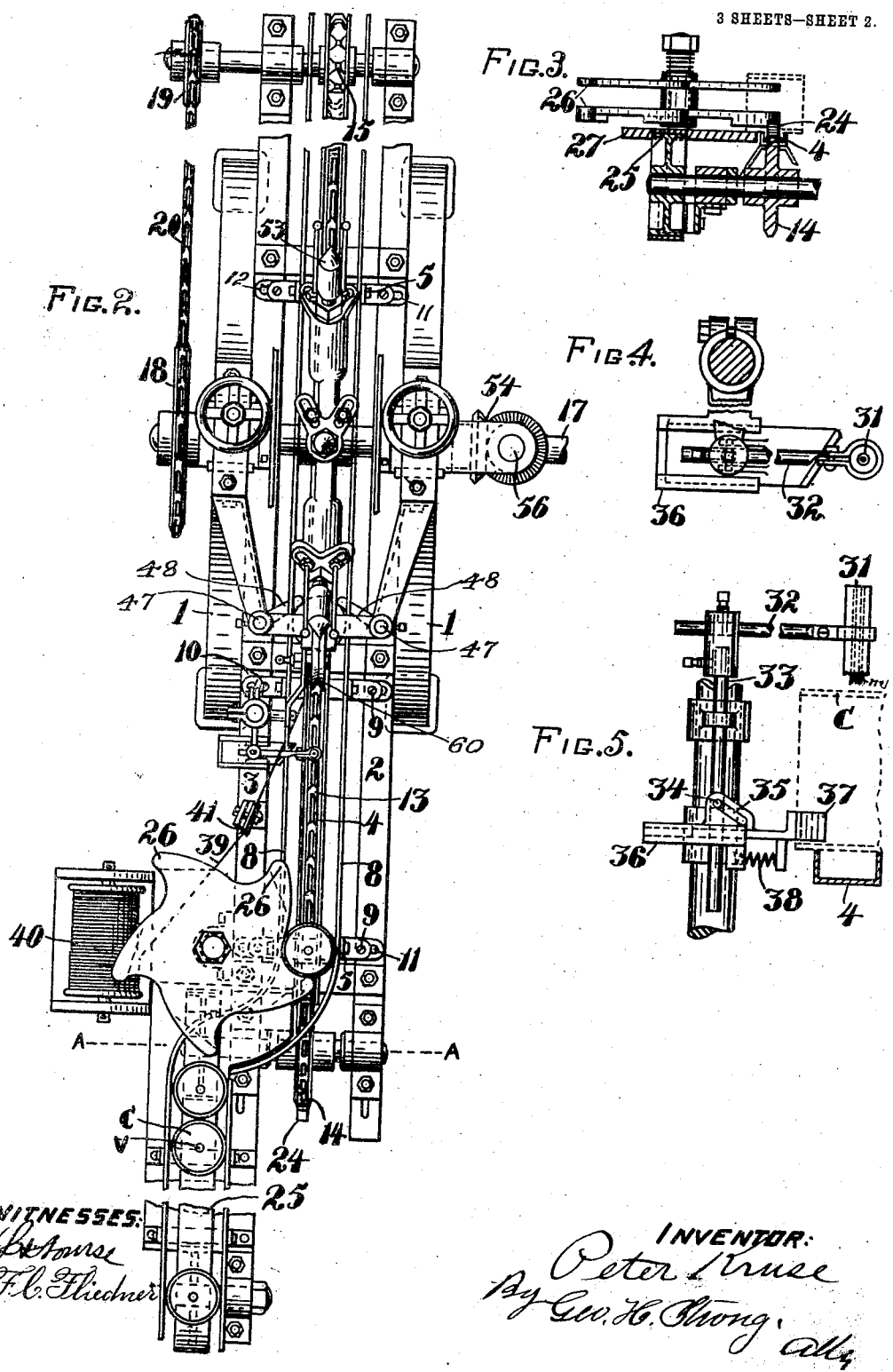

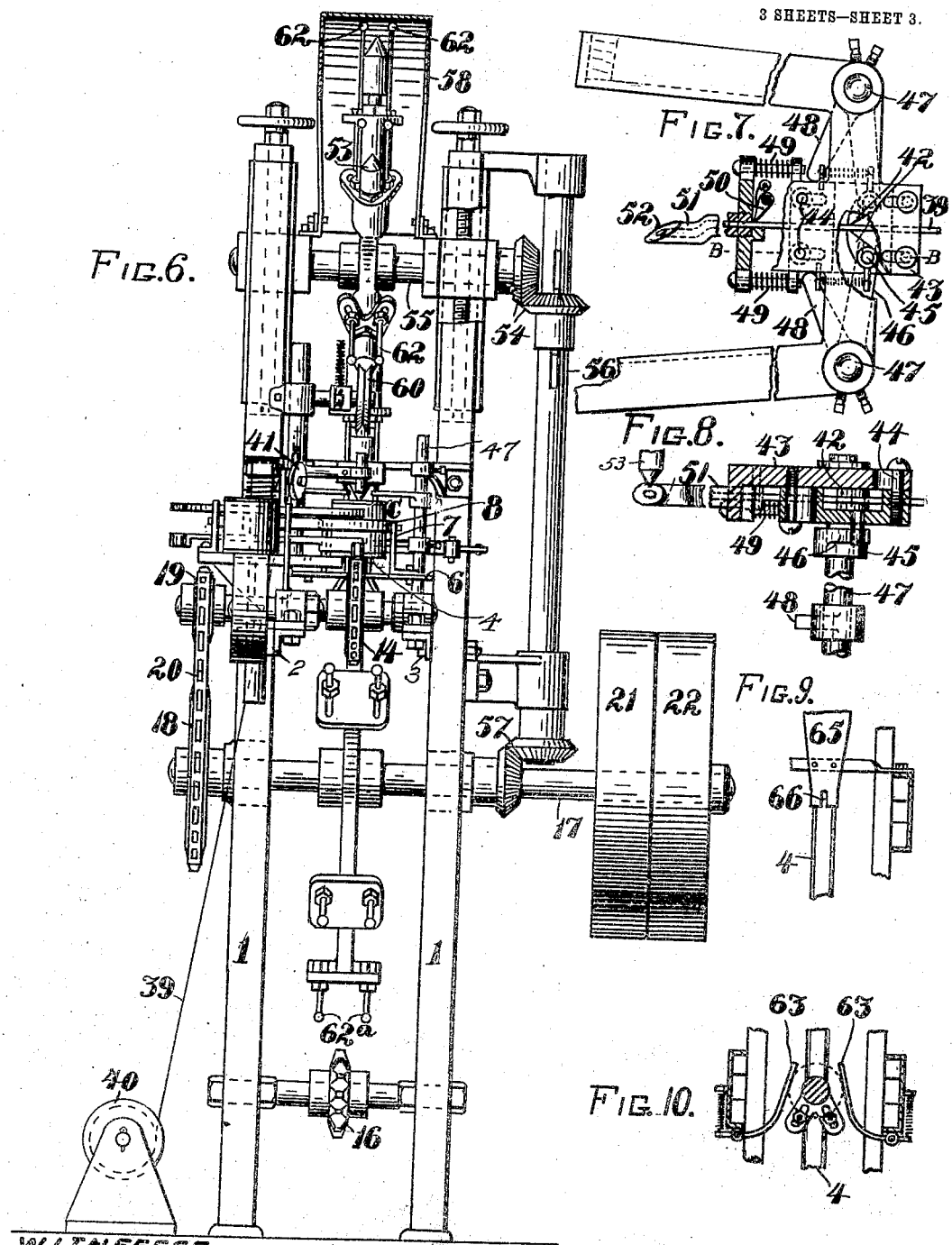

PETER KRUSE, OF ASTORIA, OREGON, ASSIGNOR OF ONE-THIRD TO ASTORIA IRON WORKS, OF ASTORIA, OREGON, A CORPORATION OF OREGON.

CAN-VENT-HOLE-SOLDERING MACHINE.

No. 832,328.     Specification of Letters Patent.     Patented Oct. 2, 1906.

Application filed May 23, 1904. Renewed July 21, 1906. Serial No. 327,214.

*To all whom it may concern:*

Be it known that I, PETER KRUSE, a citizen of the United States, residing at Astoria, in the county of Clatsop and State of Oregon, have invented new and useful Improvements in Can-Vent-Hole-Soldering Machines, of which the following is a specification.

This invention relates to the sealing of metal cans such as are used for the preservation of food products of various sorts.

As is well known to those familiar with the packing of hermetically-sealed goods, it is necessary to provide a vent in the head or cap of each can for the hot gases or vapors that form therein while the cap or head is being soldered over its contents and which if confined would interfere with the soldering operation. Again, there are certain foods that require a second sealing to admit of a preliminary cooking *in vacuo* in order to rid them of sundry impurities which will gather at the top of the can while heated and squirt out when the can cap or head is punctured. The vent in the one instance and puncture in the other are most conveniently and economically stopped off by means of solder, which is best applied with the ordinary tool after cleaning the can around its opening and depositing thereon a small quantity of acid for fluxing—operations which have hitherto generally been performed by hand.

The present machine is designed for the rapid and thorough performance of the several operations here indicated or implied—namely, the wiping of the can cap or head previously to soldering, the deposit of the flux and solder in the required amounts and at the proper place, the heating and cleaning of the soldering-tool, and adequate fusing to stop off the hole in the cap or head either as a temporary or final step in hermetically sealing the can. In the discharge of these functions the machine is properly a vent-hole soldering or "stopping-off" machine, which it is ordinarily called. At the same time the machine is peculiarly adapted to unstop the can after a first cooking of its contents to free them of impurities, as aforesaid, which it does by melting away the solder from the vent—that is, by undoing what it previously did—thus providing the most suitable outlet for the impurities, while obviating a more or less objectionable second puncture in the can cap or head elsewhere. In this capacity the machine may well be termed a "desoldering-machine."

Referring to the accompanying drawings to describe the various parts and combinations of parts of which it consists, Figure 1 is a partly-broken and partly-sectioned side elevation of the complete machine. Fig. 2 is an enlarged plan of the same, also broken in parts and minus the heating apparatus for the soldering (or desoldering) mechanism. Fig. 3 is a cross-section on the line A A of the preceding view looking up toward the upper part of the drawings or toward the rear of the machine. Figs. 4 and 5 are respectively a plan and a front elevation, both partially broken and sectioned, showing details of the mechanism that cleans the can caps or heads and supplies them with acid preparatory to soldering. Fig. 6 shows the machine in front elevation with the top thereof in section. Fig. 7 is a sectional plan of the solder-feed. Fig. 8 is a longitudinal vertical section of the same on the line B B of Fig. 7. Fig. 9 is a detail plan of a shield attached to the machine when desoldering. Fig. 10 is a similar plan of a device that operates to steady the cans while they are being soldered or desoldered. Fig. 11 is a diagrammatic view showing the movement of the soldering-iron. Fig. 12 is an enlarged detail showing the absorbent material and the means for supplying the acid thereto.

Similar characters designate similar parts wherever they occur in the different figures.

The machine comprises a housing 1, composed of two inwardly-flanged uprights or standards that are located opposite each other at a suitable distance apart and carry parallel beams 2 and 3, preferably made of angle-iron, as shown, and securely bolted one to each of said uprights or standards about midway of their height on the inside. The angle-irons 2 and 3 likewise carry a channel-iron 4, horizontally disposed thereabove and upheld longitudinally thereof by means of transverse centrally-raised braces 5, that are bolted to said angle-irons and upon the raised portion of which the web or bottom of said channel-iron rests, the latter being rigidly fastened thereto, so as to be practically level and maintained in a normally immovable position. The flanges of this channel-iron 4 are upwardly disposed and being parallel, like a pair of rails, constitute a track upon which the cans to be soldered or desoldered can ride or slide while passing through and being operated upon by the machine. To the under side of the channel-iron are also secured a number of cross-bars 6, serving as supports for angular brackets 7, that stand in pairs upon the ends of each cross-bar on opposite sides of the machine and hold between them two lateral guides 8 for the cans above the said track. The two sets of brackets are secured at their bases to their respective ends of the cross-bars, and the guides likewise secured to the upper ends of the vertical members of their respective brackets, by means of set-bolts 9 and 10, and slots 11 and 12 are respectively formed in said ends of the several cross-bars and brackets wherein the set-bolts can be shifted to effect any desired adjustment of the guides both laterally and vertically to accommodate cans of different sizes by moving the brackets toward or away from one another and the guides up or down thereupon in a manner that is easily understood. The sundry parts just enumerated make up the framework of the machine and the channel or runway provided therein for the cans whose vents are to be stopped or unstopped, as the case may be.

The cans are indicated by the letter C, and their respective vents by V.

Within the channel-iron 4 runs a link belt or sprocket-chain 13, that passes over sprocket-wheels 14 and 15 and under a similar wheel 16, the two first-named wheels being respectively located at the front and rear of the machine and having their axles journaled in suitable bearings on the angle-irons 2 and 3 and the wheel last named being mounted on and between the housing-standards 1. The belt or chain 13 is thus spread, deflected, or depressed below the channel-iron to make room for other mechanism, hereinafter described. It receives its motion from a centrally-located shaft 17, which is connected with the axis of the wheel 15 by means of sprocket-wheels 18 and 19 and a short chain 20. The shaft 17 has its bearings in the housing across the standards thereof, is the driving-shaft of the machine, and is itself driven by belting, (not shown,) having the customary fast and loose belt-pulleys 21 and 22. (Shown only in Fig. 6.) The connections are such, it will be seen, that the shaft 17 and belt or chain 13 will both turn in a like direction, so that by rotating the shaft clockwise that part of the belt or chain which runs in the channel-iron will move in the direction indicated by the arrow 23 in Fig. 1. This is the direction in which it is intended the cans C should travel in the form of the machine herein described, and the cans are thus caused to travel upon the upwardly-turned flanges of the channel-iron 4 by the said belt or chain 13, which for that purpose is provided with outward spurs or projections 24, functioned to push the several cans along the said flanges of the channel-iron. The cans when first delivered to the apparatus are received upon an endless traveling belt 25, which passes over drums and which is offset to one side of the carrying-chain 13, as plainly shown in Fig. 2.

The guides 8 are curved so as to connect the line of travel of the cans which are received upon the belt 25 with the line of travel of the carrying-chain 13, and at the point where this change of direction takes place is located a spider, having arms 26 with intermediate depressions. This spider is turnable in a horizontal plane and is so located that the depressions in front of the arms 26 will each engage a can around which they partially fit and transfer it from its first line of travel on the belt 25 to the line of travel of the carrier 13. The diameter of the spider is here shown as such that the distance or offset between these two carriers is approximately equal to the semidiameter of the spider. The cans thus transferred are set upon the tracks or supports 4, and a level board or surface 27 extends between the two tracks to support the cans during their transfer from one to the other. The spurs 24 of the chain 13, engaging the cans at this point, carry them along upon the tracks 4 between the guide-flanges 8, and the same spurs engage and rotate the spider.

The transfer-board 27, which is shown in section in Fig. 3, has a channel made in it so that the belt 25 is carried with its surface substantially level with that of the board, and the edge of the board contiguous to the supporting flanges 4 is also upon a level with these flanges, so that the can is readily moved by the spider from one line of travel to the other, and as the spurs 24 of the sprocket-chain intermittently engage the downwardly-projecting lugs of the spider, the latter will be turned upon the arrival of each spur of the chain, so as to transfer another can to its new line of travel. As the cans are carried along upon the tracks and between the guides by the traveling chain they are carried beneath a suitable absorbent material m, (shown by dotted lines in Fig. 5,) which is supplied with acid from a tank 29. A pipe 30 leads from this tank and delivers acid to the device 31, by which the acid is applied to the top and center of the can as it passes. The acid may be delivered from the pipe 30 into the tube within the absorbent material, and thus led to the bottom and keep the lower end supplied with sufficient to wipe over the point to be soldered as the can passes. This wiper is carried upon the end of an arm 32, which is supported by a vertically-guided stem or spindle 33, and this spindle has a pin 34 projecting into an inclined slot in the plate 35. This plate is carried upon a horizontally-guided and movable slide 36, said plate having an arm 37 projecting into the line of travel of the can, so that as the latter passes it moves the slide and through the action of the inclined slot 35 upon the pin 34 the wiper 31 is momentarily brought down upon the can at the right instant to apply the acid to the center, where it is desired. As soon as the can has passed a spring 38 returns the parts to their normal position and raises the wiper out of the line of travel of the can until another can appears. This device is well shown in detail in Figs. 4 and 5.

The solder-wire, which is indicated at 39, is conveniently delivered from a revoluble spool 40 and carried over a guide-pulley 41, and thence it passes to the feed device. It consists of two pawls 42. These pawls are mounted upon a slotted plate 43, which is slidable upon pins 44, passing through the slots. Pins 45, fixed to this slidable plate, enter slots in the ends of lever-arms 46. These lever-arms are carried upon vertical spindles 47, upon which spindles are fixed lever-arms 48, and these lever-arms lie in the path of the traveling cans, and the inner ends of said arms are sufficiently near together so that each can as it passes will turn the arms, and acting through the slotted levers 46 will move the plate and the pawls 42, which have sufficiently sharp edges to engage and advance the soldered wire 39 at each of such movements. The plate and pawls are returned after the passage of the can by springs 49, and a spring-pressed pawl or dog 50 prevents the wire from being dragged backward during this movement. The wire preferably passes through a tube 51, having its outer end beveled, as shown at 52, in such a manner that the end or side of each soldering-iron as it passes will move substantially in the plane of this bevel, and as a portion of the solder-wire projects through this beveled face the heated iron will melt off a sufficient amount to apply to the hole which is to be stopped. This portion of the apparatus is well shown in Figs. 7 and 8.

The soldering-irons I have shown at 53. They are carried at the outer ends of radial arms projecting from a hub or carrier, which is journaled horizontally and which is here shown as being revolved by the bevel-gears 54, receiving motion from any suitable source of power. In the present case one member of this gear is mounted upon the horizontal shaft 55, from which the soldering-irons radiate and the other member upon a vertical shaft 56, and by means of a similar bevel-gear 57 power is transmitted from the shaft 17 to revolve the soldering-irons. These irons pass through a segmental pot or chamber 58, which is suitably supported from the housing 1 and in the present case is disposed in the form of an arch, into one open end of which the arms pass during their revolution and through the other open end of which they leave this chamber. Within this chamber the irons are heated by any suitable or desired means. I have here shown such means in the form of burners 59, which discharge jets of flame or highly-heated gases into the chamber through which the irons are passing, and the temperature therein maintained will be sufficient to keep the irons as hot as may be required. Leaving this chamber the tips of the irons pass over a cleaning roll or wiper 60, which may be of any suitable or desired shape and supported in the path of the iron, so that the tips of each one will be wiped as it passes. In order to maintain these tips in proper condition, I have shown a pipe 61, leading from the acid-chamber 29 and discharging upon the wiper-roll. Pins 62 are carried in unison with the soldering-irons, and these pins serve to center the cans with relation to the irons as the latter approach the cans, and they thus maintain the small central hole of the can in the exact position which is necessary in order to allow it to be soldered and closed by the passing irons.

As the movement of any link-carrying chain or similar device is liable to be somewhat irregular, I have provided a means for placing the cans so that they will exactly meet the irons as they pass. This device consists of elastic tips or fingers 63, well shown in Fig. 10, against and between which the can contacts, and these fingers 63 act to retard its motion. Thus if the can should be slightly in advance of its proper position it would be checked by these elastic arms, and an instant later the pins 62 will come in contact with the back of the can, and thus push it forward, the iron being simultaneously in position to deliver the drop of solder from the wire and deposit it upon the part to be closed. In some cases, if found desirable, a second set of burners, as shown at 64, may be so disposed as to discharge heating-jets upon the center of the can as it passes, and thus insure the more perfect soldering. By this operation I am enabled to automatically close the central openings of cans, and these cans are delivered from the end of the carrying mechanism to any desired receiver. After being thus closed the cans are placed in a cooking apparatus, and after a certain amount of cooking, which separates certain impurities from the contents of the can and also expands the head to a certain extent, the cans are either returned to the same apparatus or passed through a similar apparatus, and the heated irons of this second apparatus serve to unsolder the openings which have been closed, as previously described, thus allowing the impurities, which are under considerable pressure within the can, to be blown out of the opening thus uncovered. In order to prevent the irons from being coated with these impurities, an inclined bridge or cover 65 is supported in such position that the iron passes over its center. A small slot is made, as at 66, so that as the iron in the can arrives at the point of contact the hole to be unsoldered will lie momentarily within this slot 66, and as the can passes beneath the closed portion 65 and the iron over the top the jet of impurities which are forced out by interior pressure from the can will strike the lower part of this bridge, while the iron passes above it and is protected from the ejected matter. The resoldering of the hole after the cooking and cleansing is complete is effected in the same manner as previously described. Thus the operations may be carried on automatically and with but very little attention.

In some cases it may be found desirable to employ a second series of pins $62^a$, similar to the pins shown at 62, and these second sets of pins are mounted upon radial revoluble arms 67, driven by the motor in unison with the movements of the pins 62, which move with the soldering-irons, and when two sets are used both sets of pins will arrive behind the can at the same instant, one set near the top and the other set near the bottom, as shown in the broken-away section of the housing in Fig. 1, and this, particularly where long cans are being operated upon, will insure all parts of the can moving evenly at the instant when the work is being done.

Although I have here shown the chain-carriers 13 as passing down around a sprocket 16, located at the lower part of the frame, this is for the purpose of providing space for the revolution of the arms 67, which carry the pins $62^a$; but if this portion of the device be dispensed with, as can be done when as many as eight soldering-irons are employed, it will be understood that the chain can extend directly from one of the pulleys to the other without making a detour, as here shown.

When fish or other greasy substance is being canned, the vent-openings may become coated and in bad condition to receive the sealing material. The wiper 31 is designed to cleanse the can as well as to apply the acid, and it does this by the rubbing or wiping action due to the movement of the parts with relation to each other.

Having thus described my invention, what I claim, and desire to secure by Letters Patent, is—

1. In a can-vent sealing and unsealing apparatus, straight horizontal guides, means for delivering cans on end between said guides, an endless chain movable between the guides and having upwardly-projecting spurs to engage the bottoms of the cans, radially-disposed soldering-irons revoluble in a vertical plane intersecting the center of the line of travel of the cans, and means by which the can-vents and irons are caused to register.

2. In a can-vent sealing and unsealing apparatus, straight horizontal guides, means for delivering cans on end between said guides, an endless chain movable between the guides, and having upwardly-projecting spurs to engage the bottoms of the cans, radially-disposed soldering-irons, revoluble in a vertical plane intersecting the center of the line of travel of the cans, and pins movable in unison with the irons to center the cans with relation to the passing irons.

3. In a can-vent sealing and unsealing apparatus, straight horizontal guides, means for delivering cans on end between said guides, an endless chain movable between the guides, with upwardly-projecting spurs to engage the bottoms of the cans, radially-disposed soldering-irons revoluble in a vertical plane intersecting a line of travel of the can-vents, and elastic fingers between which the cans pass and by which their advance is temporarily retarded.

4. In a can-vent sealing and unsealing apparatus straight horizontal guides, means for delivering cans on end between said guides, an endless chain having upwardly-projecting spurs and movable to engage the bottoms of the cans, radially-disposed soldering-irons revoluble in a vertical plane intersecting a line substantially central between the guides, elastic fingers between which the cans are carried by the chain, and pins movable in unison with the irons to insure the can-vents registering with the irons.

5. In a can-vent-sealing apparatus, straight horizontal guides means for delivering cans on end between said guides, an endless chain movable between the guides with upwardly-projecting spurs to engage and advance the cans, radially-disposed soldering-irons revoluble in a vertical plane intersecting the center of travel of the cans, means for registering and centering the cans with the irons, and means actuated by the passing cans by which solder-wire is advanced to meet the iron and the vent in unison.

6. In a can-vent-sealing apparatus, guides and an endless traveling chain with spurs movable between the guides to engage and advance cans on end, radially-disposed soldering-irons, and means by which they are revolved in a vertical plane and the can-vents caused to successively register with the passing irons, and a wire-solder-feeding device, consisting of pawls between which the wire passes, a slidable plate upon which the pawls are pivoted, fulcrumed arms projecting into the path of the can, and connections between the arms and plate whereby said plate is moved and the wire advanced to meet the can-vent and iron.

7. In a can-vent-sealing apparatus, guides and an endless traveling chain with spurs movable between the guides to engage and advance cans on end, radially-disposed soldering-irons, and means by which they are revolved in a vertical plane, and the can-vents caused to successively register with the passing irons, a single source of wire-solder supply and means by which the wire is advanced to meet each successive iron and can-vent, said means including a slidable plate, spring-pressed grips between which the wire passes, lever-arms projecting into the path of the passing cans, and connections between said arms and the plate.

8. In a can-vent-soldering apparatus, straight horizontal guides, an endless traveling chain with spurs movable between the guides to engage and advance cans on end, radially-disposed soldering-irons revoluble in a vertical plane, and means by which the can-vents are caused to successively register with the passing irons, a single source of wire-solder supply, a reciprocating plate actuated by the passage of each can, grips carried by the plate, between which grips the wire is passed, and a guide-tube having its end in the line of travel of the irons and contiguous to the can-vent, said tube end having an upwardly-presented diagonal surface through which the wire is ejected.

9. In a can-vent-sealing apparatus, straight horizontal guides, an endless traveling chain with spurs movable between the guides to engage and advance cans on end, soldering-irons revoluble in a vertical plane to intersect the line of can-vents, a belt in the same horizontal plane with the chain with guides between which the cans pass in a line at one side of the chain, a spider pivoted in line with the belt and having arms to receive and transfer the cans from the belt to the chain-carrier, a transfer-floor located between the belt and chain, and curved guides connecting the belt and chain-guides.

10. An apparatus for soldering the vents of cans, said apparatus comprising soldering-irons revoluble in a vertical plane, with means for heating said irons, a carrier upon which cans are supported on end with the vent in the plane of revolution of the soldering-irons, an acid-carrying pad, means for supplying acid thereto, means for depressing said pad into contact with each can-vent, said means consisting of a movable carrier, an inclined slotted slide engaging said carrier and an arm projecting into the path of the can and capable of being retracted by the passage of the can.

11. In a machine for sealing can-vents, a traveling can-carrier, implements revoluble in the line and direction of travel of the cans, heating and cleaning devices for said implements, means for causing the implements to substantially contact with the can-vents, and mechanism actuated by both sides of passing cans, whereby a wire or strip of sealing material is positively delivered at the contact, of the can-vent and the implement.

12. In a machine for sealing can-vents, a traveling can-carrier, implements revoluble in the line and direction of travel of the cans, arms movable in unison with the implements to contact with and advance the cans, and elastic arms between which the cans are pressed by the first-named arms, said mechanism acting to register the approaching cans and implements.

13. In a machine for sealing can-vents, a traveling can-carrier, implements revoluble in the line and direction of travel of the cans, means for heating, cleaning and registering the implements with the vents of passing cans, a solder-wire feed comprising reciprocating clamps between which the wire passes, and lever-arms between which the cans pass to simultaneously separate said arms and advance the feed-clamps.

14. In a machine for sealing can-vents, a traveling can-carrier, revoluble sealing implements, means for causing said implements to register with the passing can-vents, reciprocating wire-solder-feed grip, arms between which the cans pass to reciprocate said grips, and a guide by which the solder is presented at the point of use.

15. In a can-vent-soldering apparatus a can-carrying belt with fixed guides upon each side, an endless traveling chain with spurs to engage cans, and fixed guides upon each side, said guides and chains located at one side of the line of the belt, curved guides connecting the belt and chain-guides, a revoluble spider having arms turnable within the curved guides, said arms engaging and transferring the cans from the belt to the chains, and a surface substantially level with the belt and chains, over which the cans are transferred.

16. In a can-vent-unsealing apparatus horizontal guides, an endless traveling chain with spurs movable between the guides to engage and advance cans on end, soldering-arms revoluble in a vertical plane to intersect the line of passing can-vents, means for heating the irons during their revolutions, and a slotted bridge or cover fixed at the point where the irons and cans meet, and between the two.

In testimony whereof I have hereunto set my hand in presence of two subscribing witnesses.

PETER KRUSE.

Witnesses:
S. H. NOURSE,
JESSIE C. BRODIE.